United States Patent [19]

Hayden

[11] 4,286,763

[45] Sep. 1, 1981

[54] DERAILMENT EMERGENCY VALVE

[76] Inventor: Harold E. Hayden, Rte. 2, Box 58, Delphi, Ind. 46923

[21] Appl. No.: 51,369

[22] Filed: Jun. 25, 1979

[51] Int. Cl.³ .............................................. B60T 7/12
[52] U.S. Cl. ...................................... 246/172; 303/1
[58] Field of Search .................... 246/172, 199; 303/1

[56] References Cited

U.S. PATENT DOCUMENTS

| 788,744 | 5/1905 | Wright | 246/172 |
| 1,661,920 | 3/1928 | Carley | 246/172 |

Primary Examiner—Duane A. Reger
Attorney, Agent, or Firm—Gust, Irish, Jeffers & Hoffmann

[57] ABSTRACT

An emergency braking device for railway cars having a wheel truck provided with a fluid pressurized brake line in a wheel braking system, comprises an elongated tubular break-away valve member rigidly attached to one of the truck and car frame, and is connected in the pressurized brake line. A flexible substantially inextensible cable is connected between the valve member and the other of the truck and car frame. The cable is connected between points which are on a line substantially normal to the valve member. The cable length is such as to permit normal movement between the car frame and the truck without being tensioned but is tensioned during abnormal movement therebetween corresponding to an emergency condition, at which time the valve member is caused to rupture providing an escape path for the pressurized brake fluid to automatically brake the railway car.

8 Claims, 7 Drawing Figures

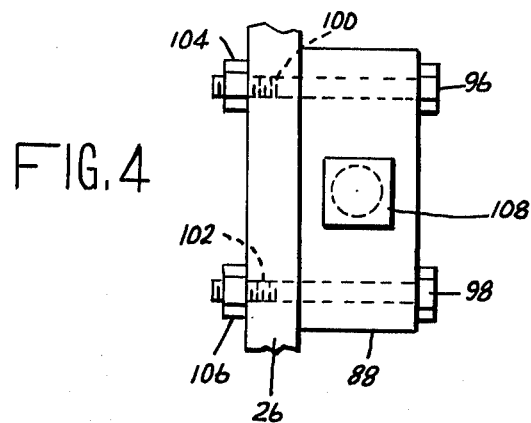
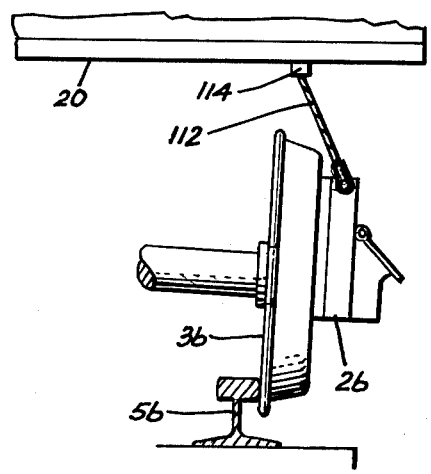
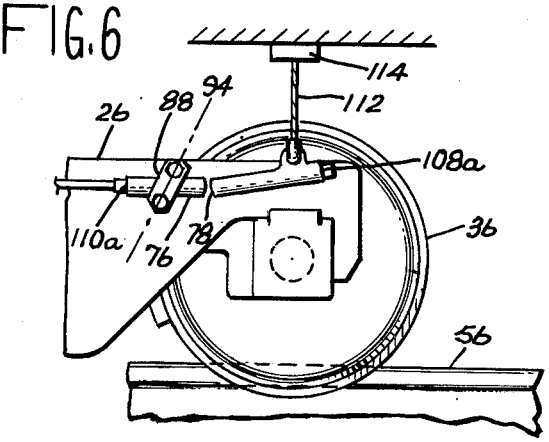

DERAILMENT EMERGENCY VALVE

BACKGROUND OF THE INVENTION

1. Field of the Invention

This invention is in the field of safety devices for emergency braking devices for railway cars wherein a braking action is automatically applied to the car wheels at the inception of an emergency condition.

2. Description of the Prior Art

Numerous attempts have been made over the years to provide emergency braking of railway cars whenever a car wheel leaves the track or is otherwise in an abnormal separated state from the car frame. The purpose of these devices is to automatically apply an immediate braking force to the car wheels at the inception of an emergency condition. If the emergency condition is sensed sufficiently early, braking is applied to the entire train before all the wheels of the car are derailed, thus minimizing the probability of further derailment and consequent damage. Principal causes of the emergency conditions include broken wheels and truck components, severe slueing or rocking of the car frame, and track obstacles.

In conventional train braking systems, reduction of air pressure in the brake line will cause a braking of the train wheels bringing the train to a stop. In prior art devices, valves have been provided which automatically open or rupture in an emergency condition to relieve the pressure in the brake line to initiate the automatic braking of the train wheels. Examples of the prior art include the devices in the following U.S. Pat. Nos. 624,103; 870,284; 1,205,402; 1,227,913; 1,240,127; 3,938,765 and 3,998,413.

While these devices function in a manner to bring about the desired stopping of the train, they generally do not have complete reliability or are relatively expensive to manufacture. For example, the device in U.S. Pat. No. 1,227,913 is of a construction wherein, due to lack of a rigid mounting of the plug member and due to attachment points of the cable which is connected between the plug member and the wheel truck, the reliability of rupturing the plug member in an emergency condition is impaired.

SUMMARY OF THE INVENTION

An elongated tubular break-away valve member is rigidly attached at one end to a metallic block rigidly secured to one end of the valve member. The valve member and block may be a unitary casting. The block is bolted, or otherwise firmly attached, to one of the railway car frame and wheel truck. The valve member is connected in fluid tight relation to the pressurized train brake line as with a threaded fitting.

A flexible substantially inextensible cable is attached at one end at a first connection point to the valve member and is connected at the other end at a second connection point to the other of the car frame and wheel truck. The cable is of a length to accommodate normal movements between the car frame and truck without cable tension but during abnormal movements between the car frame and truck, corresponding to a wheel dropping off a rail, the cable will be tensioned to cause the valve member to break-away, releasing the pressure in the brake line and causing the train brakes to be automatically applied.

The first and second connection points are on a line substantially normal to the longitudinal axis of the valve member so that when the car frame and truck frame are in relatively separated positions corresponding to an emergency condition, the cable is tensioned and a force is exerted substantially normally to the valve member to maximize the break-away force and thus insure the break-away of the valve. Preferably, a valve member is provided adjacent each wheel in a truck frame so that if any wheel is separated from the car frame corresponding to the emergency condition, the train brakes will be automatically applied. Further, the axis of the rigid block is canted to the axis of the valve member so that the block provides a greater supporting length and supporting area to the member increasing the rigidity of the member attachment for a given block cross-section.

It is therefore an object of this invention to provide a derailment emergency valve which is reliable and consistent in operation to automatically actuate the train brakes at the inception of an emergency condition, and which is relatively inexpensive in manufacture and durable in construction.

Another object of this invention is to provide in the valve of the previous object a break-away member to which is applied a substantially normal force at the inception of the emergency condition to insure valve member rupture.

Another object of this invention is to provide a valve member of the previous objects for each wheel of a railway car for earlier detection of an emergency condition.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is an elevational view of the valve member of FIG. 3 mounted on the wheel truck, partially shown;

FIG. 5 is a partial end elevational view with a wheel shown off the track;

FIG. 6 is a partial side elevational view of FIG. 5; and

DESCRIPTION OF THE PREFERRED EMBODIMENT

Figure 1:
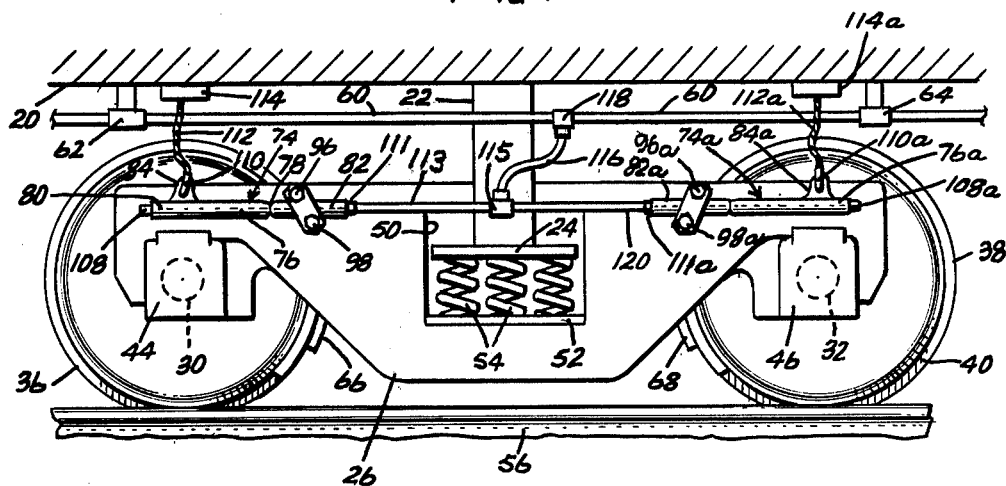
FIG. 1 is a partial side elevational view of an embodiment of this invention mounted on a wheel truck and a railway car frame.
Figure 2:
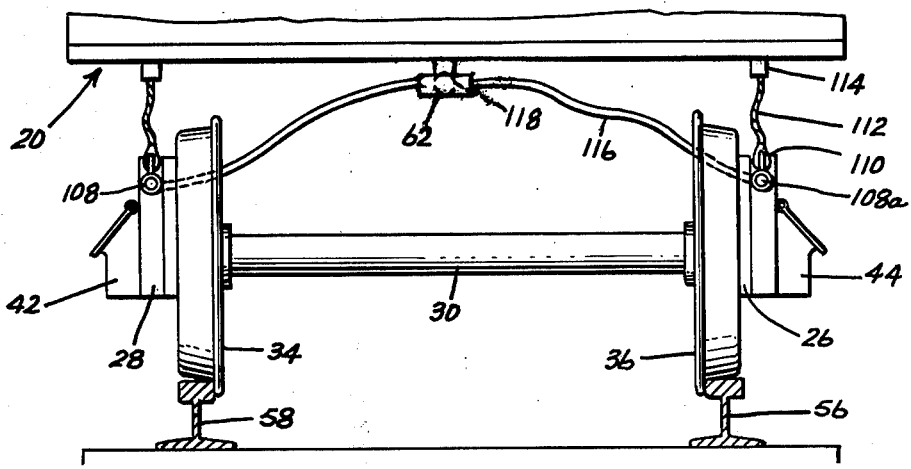
FIG. 2 is an end elevational view of the embodiment of FIG. 1.
Figure 3:
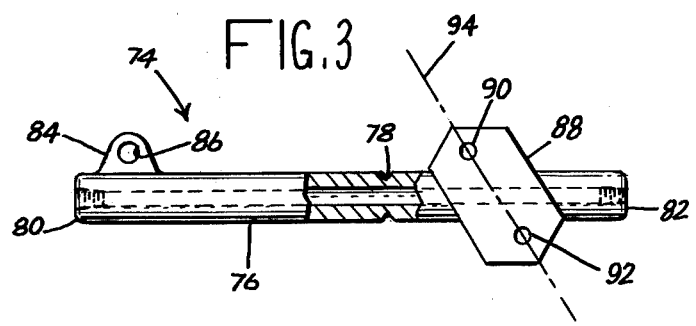
FIG. 3 is an enlarged view of the valve member embodiment in FIGS. 1 and 2.

Referring to FIGS. 1-3, a railway car frame 20 has a supporting bolster 22 secured transversely to the underside thereof and a platform 24 secured to the lower end of bolster 22. Transversely spaced wheel trucks 26, 28 provide support for transverse axles 30, 32. Flanged wheels 34, 36 are journaled to the opposite ends of axle 30, and flanged wheels 38, 40 are journaled to the opposite ends of axle 32. Axle 30 ends are provided with journal boxes 42, 44, respectively, for receiving journal lubrication and each axle 32 end is similarly provided with a journal box, box 46 being shown in FIG. 1. Each truck 26, 28 is provided with an opening, opening 50 being shown for truck 26, in which are supported on the lower surface 52 thereof three heavy duty coil springs 54. Platform 24 at each end is resiliently supported on the upper ends of springs 54. Wheels 36, 40 are in rolling engagement with track 58. In general, there are four wheel trucks used for each railway car.

Train brake line 60 is pneumatically pressurized and is supported by brackets 62, 64 to the underside of car frame 20. Loss of pressure in line 60 will automatically actuate, by means not shown, arcuate wheel brake pads against the wheel periphery to effect wheel braking. Pads 66, 68 are partially shown for wheels 36, 40 respectively. The structure defined to this point is conventional in the railway car art and is well understood. Some structure has been omitted and other shown in simplified form for the purpose of simplicity and clarity.

Referring to FIGS. 3 and 4, valve member 74 has an elongated tube or pipe 76 having a pronounced encircling groove 78 formed intermediately thereof and having internal pipe threads formed at ends 80, 82. A lug 84 having an eye 86 is integrally formed on the upperside of pipe 76 at end 80. An elongated bracket block 88 having apertures 90, 92 at opposite ends thereof is integrally formed with pipe 76 between groove 78 and end 82 as shown. The axis 94 of block 88 is canted to the longitudinal axis of pipe 76 in order to provide greater support and rigidity for pipe 76. Also, due to the angle between axis 94 and the upper surface of pipe 76, pipe 76 is rigidly supported in an area closely adjacent to groove 78 on the same side of pipe 76 to which the rupture force is applied, aiding in the reliability and consistency of the operation of the device, as will be more fully explained. Pipe 76, lug 84, and block 88 may all be formed in a single casting operation of cast iron.

Referring to FIGS. 1–4, a valve 74 is securely and rigidly attached to truck 26 by bolts 96, 98 which are inserted through apertures 90, 92 respectively of block 88, and truck 26 apertures 100, 102 (FIG. 4) respectively. Bolts 96, 98 are secured in place by means of nuts 104, 106 respectively. A plug 108 is threaded into end 80 of pipe 56 to provide a pneumatic seal. A heavy grommet 110 is crimped to one end of a stranded steel cable 112 which has been inserted through eye 86 of lug 84 to firmly attach cable 112 to lug 84. The other end of cable 112 is firmly attached to the underside of car frame 20 by means of a bracket 114. Cable 112 is of a length to remain slack during normal movements between truck 26 and frame 20 but becomes taut during an emergency condition, such as when a wheel drops off a rail. The connection points at lug 84 and bracket 114 are on a line that is substantially normal to the longitudinal axis of pipe 76, and as will become apparent, this aids in the reliable, consistent rupture of pipe 76 at groove 78 in an emergency condition.

End 82 of pipe 76 is connected by pneumatic fitting 111 to one end of air line 113 which is connected at its other end by T-connector 115 to the train air brake line 60 through flexible line 116 and T-connector 118. Air line 120 is connected between connector 115 and end 82a of valve 74a by means of fitting 111a. It is to be understood that valve 74a is identical in construction, operation, and attachment to truck 26 and car frame 20 as is valve 74 with corresponding parts having identical reference numerals with the suffix "a".

Referring to FIGS. 5 and 6, the operation of valve 74 will be described. At the inception of an emergency condition, wheel 36 leaves track 56 and is shown, FIG. 5, in its initial downward movement relative to track 56.

Since at this time, car frame 20 has not dipped or followed wheel 36, due in part to support by the remaining trucks on the car and due to the support offered by springs 54, the separation between wheel 36 and truck 26 is increased to a point where normally slack cable or strand 112 becomes taut, exerting a substantially normal force to pipe 76 at the connection point between cable 112 and lug 84. Since cable 112 is exerting a force normal to pipe 76, for a given tensional force in cable 112, applied to lug 84, a maximum bending or rupturing moment will be applied to pipe 76 causing the pipe to rupture at groove 78, FIG. 6. Further, due to the rigid connection afforded by block 88 between pipe 76 and truck 26, for a given tensional force in cable 112, rupture of pipe 76 is more likely to occur, thereby resulting in a minimum delay between the inception of the emergency condition and the pipe 76 rupture. Still further, since block axis 94 is canted to the longitudinal axis of pipe 76, pipe 76 is more rigidly held to truck 26 and the point of pipe 76 support in block 88 is closer to groove 78 on the side of pipe 76 on which the tensional force in cable 112 is exerted. This further insures the breaking of pipe 76 on a predetermined tensional force in cable 112.

On fracture or rupture of pipe 76, the pressure in the train brake like 60, which may be in the order of 80 psi, is relieved due to the pneumatic connection between line 60 and pipe 76 through lines 116 and 113. Upon loss of pressure, the train braking system is actuated, bringing the train quickly to a stop to prevent further car and train derailment and possible overturning.

Preferably, each wheel axle 30, 32 is provided at each end with a valve 74, with the lug 84 being in substantial vertical alignment with the respective axle end, so that upon any wheel leaving the track, or any excessive movement between a car and a wheel, the corresponding valve will be fractured and the train braking system actuated.

Modifications may include connecting of the line 60 and pipe 76 at end 80 by removing threaded plug 88 and inserting a pneumatic fitting to a line which is pneumatically connected to line 60. Further, block 88 may be formed separately from pipe 76 and have an opening therein for receiving pipe 76 and then welded at each end of the opening to secure pipe 76 therein.

Figure 7:
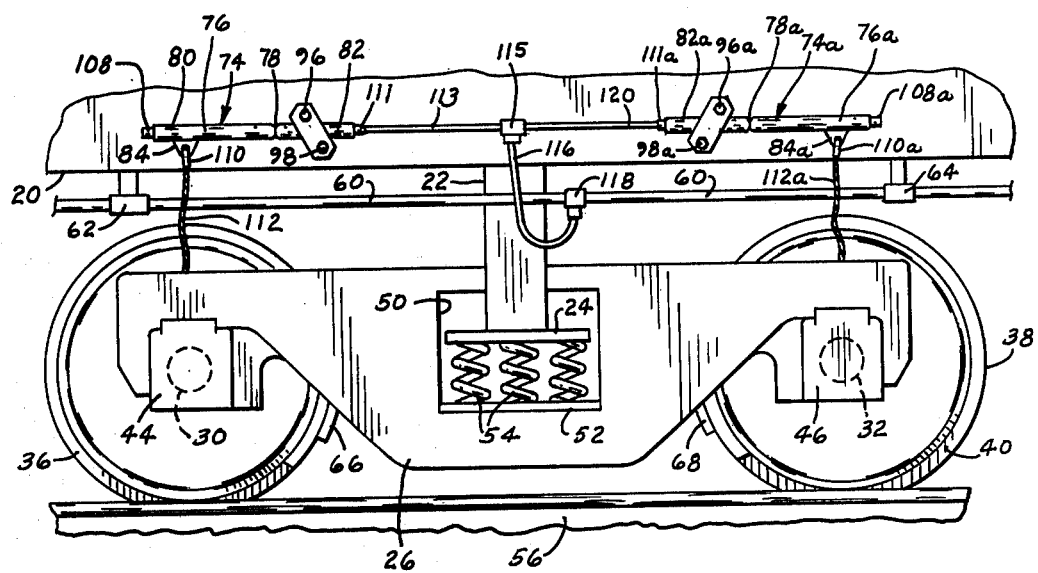
FIG. 7 is a view like FIG. 1 but with certain parts reversed.

FIG. 7 shows the arrangement of FIG. 1 wherein the valve 74 is mounted on car frame 20 and cable 112 is attached between the lug 84 and truck 26.

In a satisfactory working embodiment of valve 74, the dimensions, when the material is cast iron are as follows:

| | |
|---|---|
| Length of pipe 76 | 19 inches |
| Distance between end 80 and groove 78 | 9½ inches |
| Interal diameter of pipe 76 | ¾ inch |
| External diameter of pipe 76 | 1¾ inches |
| Height of Block 88 | 5¼ inches |
| Dimension of block 88 transverse to axis 94 | 3 inches |
| Distance between end 80 and nearest corner of block 88 | 10¼ inches |
| Distance between end 82 and nearest corner of block 88 | 3 inches |

While there have been described above the principles of this invention in connection with specific apparatus, it is to be clearly understood that this description is made only by way of example and not as a limitation to the scope of the invention.

What is claimed is:

1. Apparatus for emergency braking of a railway car which includes two parts, one part being an elongated wheel truck and the other part being a car frame, the wheel truck being provided with at least one axle for rotatably supporting a train wheel and having a fluid pressurized brakeline in a wheel braking system, and the wheel truck resiliently supporting said car frame, the improvement comprising:

an elongated tubular break-away valve member;

means for connecting said member in fluid tight relation to said pressurized brake line whereby the fluid pressure is maintained in said line and in said member;

means for rigidly attaching said member at one point thereon to one of said parts, said member extending substantially horizontally on and having a portion extending beyond said point of attachment, a peripheral groove in said member adjacent to said point of attachment, a flexible, substantially inextensible cable having one end attached at a first connection point to said extended portion and the other end attached at a second connection point to the other of said parts; said cable being dimensioned so that during a predetermined separation of said car frame and truck tensional force is produced in said cable causing said valve member to break-away;

said first and second points being on a line substantially vertically and normal to the longitudinal axis of said member so that when said car frame and truck are in relatively separated positions corresponding to an emergency condition, said cable is tensioned and said force is exerted substantially normal to the longitudinal axis of said member to maximize the break-away force on said member at said groove thus providing fluid escape from said line when rupture occurs to reduce the pressure in said line sufficiently to actuate wheel braking during emergency conditions.

2. The apparatus of claim 1 wherein said member is mounted on one of said parts with said first connection point substantially vertically aligned with an axle end whereby axle end and wheel movement relative to the car frame is individually sensed.

3. The apparatus of claim 2 wherein said truck is provided at each wheel with a valve member.

4. The apparatus of claim 1 wherein said valve member is rigidly attached to said truck.

5. The apparatus of claim 1 wherein said attachment means comprises a rigid block adapted for bolting to one of said parts;

said valve member being rigidly secured in said block.

6. The apparatus of claim 5 wherein said block and said member comprise a unitary casting.

7. The apparatus of claim 5 wherein said block is elongated and the axis of said block is canted to the longitudinal axis of said member whereby said block provides a greater supporting length and area to said member.

8. The apparatus of claim 7 including a peripheral groove formed in said member in said extended portion;

said block being canted towards that portion of said groove on the member side to which said rupture force is applied so that a block support area is closely adjacent said groove at said groove portion.

* * * * *